United States Patent [19]

Wiley et al.

[11] 4,357,613

[45] Nov. 2, 1982

[54] INK JET PRINTER AND CHARGE DECOUPLING DEVICE THEREFOR

[75] Inventors: Robert A. Wiley, Richardson, Tex.; Theodore F. Williams, Union, Ohio; James W. Davis, Richardson, Tex.

[73] Assignee: The Mead Corporation, Dayton, Ohio

[21] Appl. No.: 150,130

[22] Filed: May 15, 1980

[51] Int. Cl.³ .......... G01D 15/18

[52] U.S. Cl. .......... 346/75; 346/140 R

[58] Field of Search .......... 346/75, 140 R, 140 PD, 346/140 IJ; 118/602; 239/126

[56] References Cited

U.S. PATENT DOCUMENTS

| | | | |
|---|---|---|---|
| 3,701,998 | 10/1972 | Mathis | 346/75 |
| 3,798,656 | 3/1974 | Lowy et al. | 346/1 |
| 3,916,421 | 10/1975 | Hertz | 346/75 |
| 4,004,513 | 1/1977 | Watanabe et al. | 101/426 |
| 4,023,182 | 5/1977 | Arway et al. | 346/75 |
| 4,031,563 | 6/1977 | Paranjpe et al. | 346/75 |

*Primary Examiner*—G. Z. Rubinson
*Assistant Examiner*—W. J. Brady
*Attorney, Agent, or Firm*—Biebel, French & Nauman

[57] ABSTRACT

An ink jet printer includes a charge decoupling device which permits fluid flow of electrically conductive fluid between a high voltage electrode and a grounded fluid reservoir while presenting a high impedance electrical path therebetween. The charge decoupling arrangement includes a nonconductive casing defining an interior casing cavity which is separated into an upper and a lower portion by means of a perforated plate extending horizontally across the cavity. A plurality of drop stabilizers are mounted adjacent associated ones of the perforations to define downwardly extending capillary fluid paths from the perforations into the lower portion of the cavity to form fluid drops which drip off of the bottoms of the stabilizers. The break up of the fluid into drops provides the high impedance path through the charge decoupling device, thus ensuring that the deflection electrode arrangement and the catchers are substantially electrically isolated.

18 Claims, 3 Drawing Figures

AIR
16
46
50
52
54
56
58
60
62
64
66
68
70
72
74
76
78
80
82
83
84
86
88
90
92

INK JET PRINTER AND CHARGE DECOUPLING DEVICE THEREFOR

BACKGROUND OF THE INVENTION

The present invention relates to a fluid flow device which permits electrically conductive fluid to flow therethrough from an inlet line to an outlet line, while maintaining a relatively high impedence electrical path between the inlet and outlet lines. More particularly, the present invention relates to a device forming a part of the ink return system of an ink jet printer for returning electrically conductive ink from a catcher, maintained at a high electrical potential, to a grounded fluid supply container.

In ink jet printers, such as disclosed in U.S. Pat. No. 3,701,998, issued Oct. 31, 1972, to Mathis, a plurality of jet drop streams of drops of electrically conductive ink are directed toward a print receiving medium. The streams are produced by supplying ink under pressure to an electrically grounded print head which includes an orifice plate defining a plurality of orifices. Fluid filaments emerge from the orifices and are mechanically stimulated such that drops of substantially uniform size and spacing are formed from the tip of each of the fluid filaments. Charge electrodes are positioned adjacent the fluid filament tips and charge potentials are supplied to the electrodes, inducing corresponding charges of opposite polarity in the tips of the fluid filaments. The induced charges are carried away by drops which are formed from the fluid filaments.

The selectively charged drop streams thereafter pass through a deflection field extending between an electrically conductive deflection electrode, raised to a relatively high electrical potential, and a pair of grounded drop catchers. Drops in the jet drop streams which carry a charge are deflected to strike one of the drop catchers on a face thereof. The drops are thereafter ingested into the catcher through a slot extending along the bottom of the catcher face. A vacuum line is connected to an internal catcher cavity to carry away the ink ingested into the catcher cavity and to return the ink to an ink supply tank. Ink from the tank is supplied under pressure to the print head. The uncharged jet drop streams pass unaffected through the deflection field and strike the print receiving medium so as to form collectively a print image thereon.

Since the catchers of the Mathis printer are electrically grounded, electrically conductive ink from the catchers may be returned to the grounded ink supply tank and, subsequently, to the grounded print head without maintaining electrical isolation between these printer elements. When a printer element, such as the porous deflection electrode disclosed in U.S. Pat. No. 4,031,563, issued June 21, 1977, to Paranjpe et al., is maintained at an elevated electrical potential and ingests electrically conductive ink, however, it is necessary to provide some means for electrically isolating the printer element from the ink supply. In the Paranjpe et al printer, a fluid trap is provided in the vacuum line connected to the deflection electrode to ensure that the deflection electrode is electrically isolated from the rest of the recording head. The trap consists of a stoppered beaker which accumulates ink in the bottom thereof and has a vacuum line connected through the stopper to supply a partial vacuum to the air space in the beaker above the accumulated ink. The Paranjpe et al device, however, makes no provision for return of accumulated ink to the printer ink supply.

U.S. Pat. No. 3,798,656, issued Mar. 19, 1974, to Lowy et al., discloses a printer in which drop catchers, maintained at both positive and negative potentials, create deflection fields for deflecting jet drop streams to selected print positions. The catchers also catch and ingest drops which are not to be deposited upon the print receiving medium. The catchers which are held at a positive deflection potential are connected to a common vacuum manifold which carries the fluid ingested into the catchers to a denebulization chamber through which vacuum is supplied to the catchers. Similarly, the catchers which are held at a negative deflection potential are connected to a second common vacuum manifold which supplies the fluid ingested thereby to a second denebulization chamber.

Each denebulization chamber defines a cavity in which is positioned a high surface tension material, such as metal wool. Ink drops fall from the wool, through a funnel-shaped partition, into a lower portion of the cavity with the drops striking a grounded conductive plate and thereafter passing through an outlet conduit to an ink supply tank. The conversion of the stream of ink from the manifold into separated ink drops produces a high impedence path to the grounded conductive plate with the result that the catchers are not shorted to ground and may be maintained at the desired deflection potentials. The denebulization devices of the Lowy et al printer have limited fluid flow rate capabilities. Additionally, since the charged drops strike a grounded conductive plate, electrochemical degradation of the plate may occur.

U.S. Pat. No. 3,916,421, issued Oct. 28, 1975, to Hertz, and U.S. Pat. No. 4,004,513, issued Jan. 25, 1977, to Watanabe et al. both disclose other types of ink jet printers in which ink is collected on a charged drop collection surface and thereafter drips into a collection pan. The single drop stream produced in the Hertz and Watanabe et al. printers provides a high impedence path to the collection pan. Such arrangements, however, are somewhat limited in the maximum flow rate of ink which can be collected.

It is seen, therefore, that there is a need for a charge decoupling device for use in the vacuum return line of an ink jet printer for providing a high impedence electrical path from the printer catcher or other printer element, maintained at a high electrical potential, and a grounded fluid supply, while at the same time permitting a high flow rate of electrically conductive fluid therethrough.

SUMMARY OF THE INVENTION

An ink jet printer includes a device for connecting a fluid inlet line and a fluid outlet line to permit flow of electrically conductive fluid therebetween, while presenting a low conductivity electrical path between the fluid inlet and outlet lines. The device includes an electrically nonconductive casing means defining an interior casing cavity and further defining an inlet opening in the upper portion thereof connected to the inlet line and communicating with the cavity and an outlet opening in the lower portion thereof connected to the outlet line and communicating with the cavity. A perforated plate defining a plurality of perforations is mounted in the cavity, extending thereacross, to divide the cavity into an upper fluid receiving portion and a lower portion. A plurality of drop stabilizer means are mounted adjacent associated ones of the perforations. Each drop stabilizer means defines a downwardly extending fluid capillary path from the associated perforations into the lower portion of the cavity. Fluid supply to the device through the fluid inlet line accumulates on the perforated plate in the upper portion of the cavity and thereafter passes downward through the perforations along associated capillary paths forming a plurality of drops which drip from said stabilizer means. A low conductivity path is thus provided between the inlet and outlet lines.

The nonconductive casing means may define a vacuum opening communicating with the upper portion of the casing cavity. A vacuum means may be connected to the vacuum opening for providing a partial vacuum within the upper portion of the casing. Each of the drop stabilizer means may define a pair of downwardly extending fluid flow surfaces, the surfaces being spaced apart so as to provide a capillary path therebetween which tends to draw fluid from the perforations associated therewith to the lower end of the stabilizer means. A fluid drop stream is thereby formed from the lower end of the stabilizer means.

The stabilizer means may each include a lower arcuate portion and a pair of upwardly extending leg portions. The leg portions define the capillary path and engage the perforated plate adjacent opposite sides of a perforation. The fluid flow surfaces may be closer together adjacent the perforation than adjacent the lower arcuate portion, whereby the fluid is not retained adjacent the lower end of the stabilizer means by capillary action, but flows from the lower end thereby forming a drop stream. The upwardly extending leg portions may extend through the perforation associated therewith and may be spring biased apart such that they are urged against the sides of the perforation. Further, the upper ends of the leg portions may be bent outwardly to engage the upper surface of the perforated plate, thereby supporting the stabilizer means within the perforation.

The device may be incorporated into the charge decoupling system of an ink jet printer for removing accumulated fluid from the catchers and returning the fluid to the fluid supply means while presenting a high impedence electrical path between the catchers and the fluid supply means. The charge decoupling system includes a pair of electrically nonconductive charge decoupling container means, each container means defining an upper fluid receiving chamber and a lower drop chamber. Each container means further includes a perforated plate, defining a plurality of perforations, extending horizontally within the container so as to separate the upper and lower chambers. Each container means further includes drop forming means associated with each of the perforations in the lower drop chamber for defining capillary paths extending downward from each of the perforations, whereby fluid drop streams from each of the perforations are produced. Vacuum lines connect each of the catchers of the ink jet printer to a respective one of the upper fluid receiving chambers of the container means. A common manifold, connected to the lower chamber of each of the container means, defines a fluid trap in which drops from the container means are intermingled to neutralize charges carried thereby. A supply line means connects the common manifold with the fluid supply for the printer for returning fluid thereto, whereby the catchers are electrically isolated from each other and from the fluid supply means such that the catchers may be maintained at electrical deflection potentials of opposite polarity, while the print head of the printer is grounded and electrically conductive fluid is recirculated from the catchers to the print head.

Accordingly, it is seen that it is an object of the present invention to provide a device which permits a flow of electrically conductive fluid therethrough, while preventing the fluid from providing a high conductivity electrical path; to provide such a device in which the flow of fluid therethrough is broken up into a plurality of drops within the device; to provide an ink jet printer incorporating such a device in the fluid return path from a catcher which is maintained at an elevated deflection potential; and to provide a pair of such devices in a printer to provide fluid flow from a pair of catchers, to the fluid supply tank for the printer, said catchers being maintained at differing electrical potentials.

DETAILED DESCRIPTION OF THE PREFERRED EMBODIMENT

Figure 1:
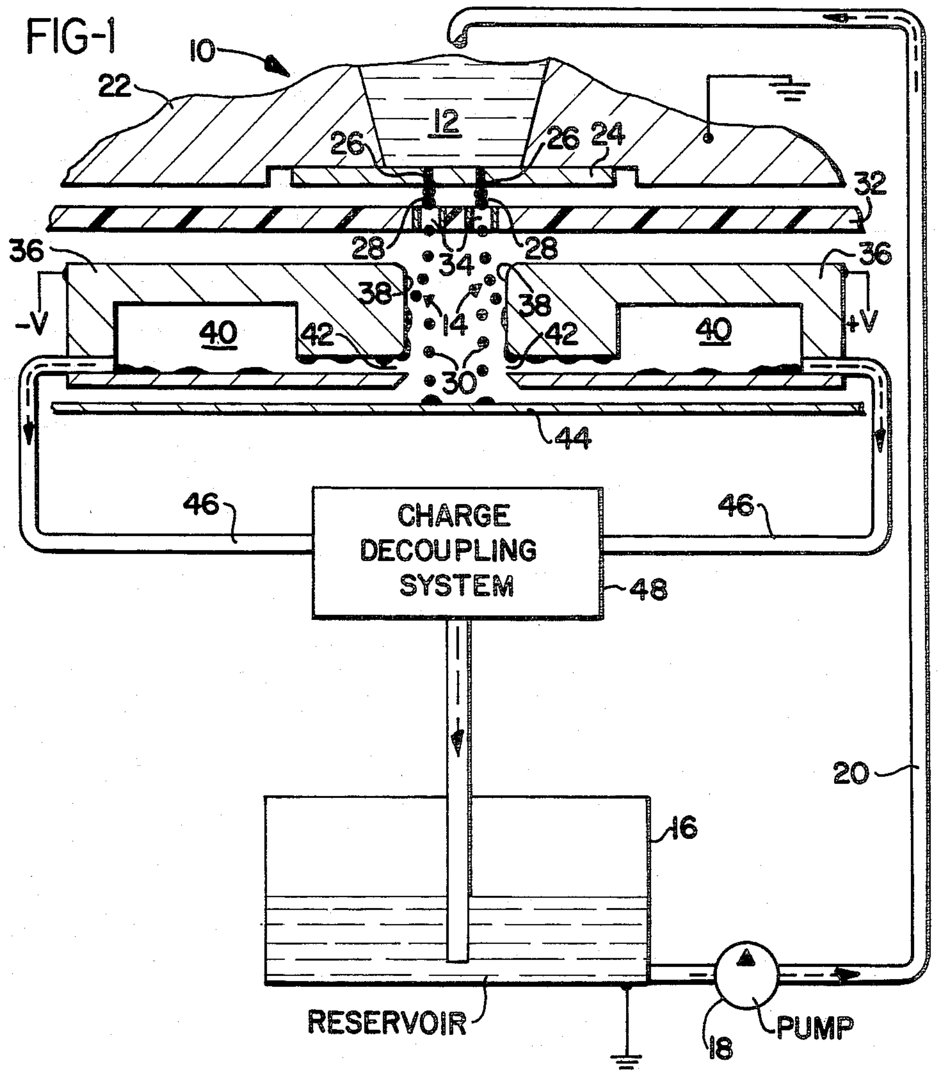
FIG. 1 is a partial sectional view of an ink jet printer incorporating the charge decoupling system of the present invention.

The present invention relates to an ink jet printer and to a charge decoupling device, connectable in the fluid flow return path from the printer catchers to the fluid supply tank. The charge decoupling device presents a low conductivity electrical path in the fluid return, while permitting a substantial flow of electrically conductive fluid therethrough. FIG. 1 illustrates an ink jet printer constructed according to the present invention. This printer is similar, with certain exceptions, to the printer disclosed in U.S. Pat. No. 3,701,998, issued Oct. 31, 1972, to Mathis.

The printer includes an electrically grounded print head 10 defining a fluid receiving reservoir 12 from which a plurality of jet drop streams 14 issue. A fluid supply means, including fluid supply tank 16, pump 18, and supply line 20, supplies electrically conductive ink to reservoir 12. Print head 10 includes manifold 22 and orifice plate 24. Orifice plate 24 defines a pair of parallel rows of orifices 26 from which fluid filaments 28 emerge. Fluid filaments 28 are mechanically stimulated by a piezoelectric transducer in a known manner, such as shown in the Mathis patent, to produce a series of ink drops 30 of substantially uniform size and spacing from the tip of each of the fluid filaments 28.

A drop charging means, including charge electrode plate 32 defining electrode openings 34, is provided for charging selectively drops in the jet drop streams. Openings 34 are lined with electrically conductive material, thus forming charge electrodes to which charge potentials may be applied via conductors (not shown) plated on the surface of plate 32. When a charge potential is applied to one of the electrodes, a charge of opposite polarity is induced in the associated fluid filament tip and this charge is carried away by a drop 30 as the drop is formed. A deflection electrode means includes a pair of drop catchers 36 which are positioned on opposite sides of the rows of jet drop streams and to which deflection potentials of opposite polarity are applied to produce a deflection field extending therebetween. Charged drops passing downward through the deflection field are deflected outwardly such that they strike the faces 38 of catchers 36, thereafter running down the faces and being ingested into catcher cavities 40 through slots 42 which extend along the catchers beneath the faces 38. Ink ingested into the catcher cavities 40 is carried away by vacuum lines 46 and returned to the fluid supply tank 16 via charge decoupling system 48. Uncharged drops, however, pass downward through the deflection field unaffected and are deposited on print receiving medium 44 to form collectively a print image thereon.

In order to produce outward deflection of charged drops in both rows of the jet drop streams, drops in one of the rows are selectively charged to a positive charge level, while drops in the other row of jet drop streams are selectively charged to a negative charge level. It should be appreciated, however, that a printer constructed according to the present invention may utilize an additional charge electrode extending between the rows of jet drop streams. Such a drop charging and catching arrangement is suggested in the above identified patent to Mathis.

Figures 2, 3:
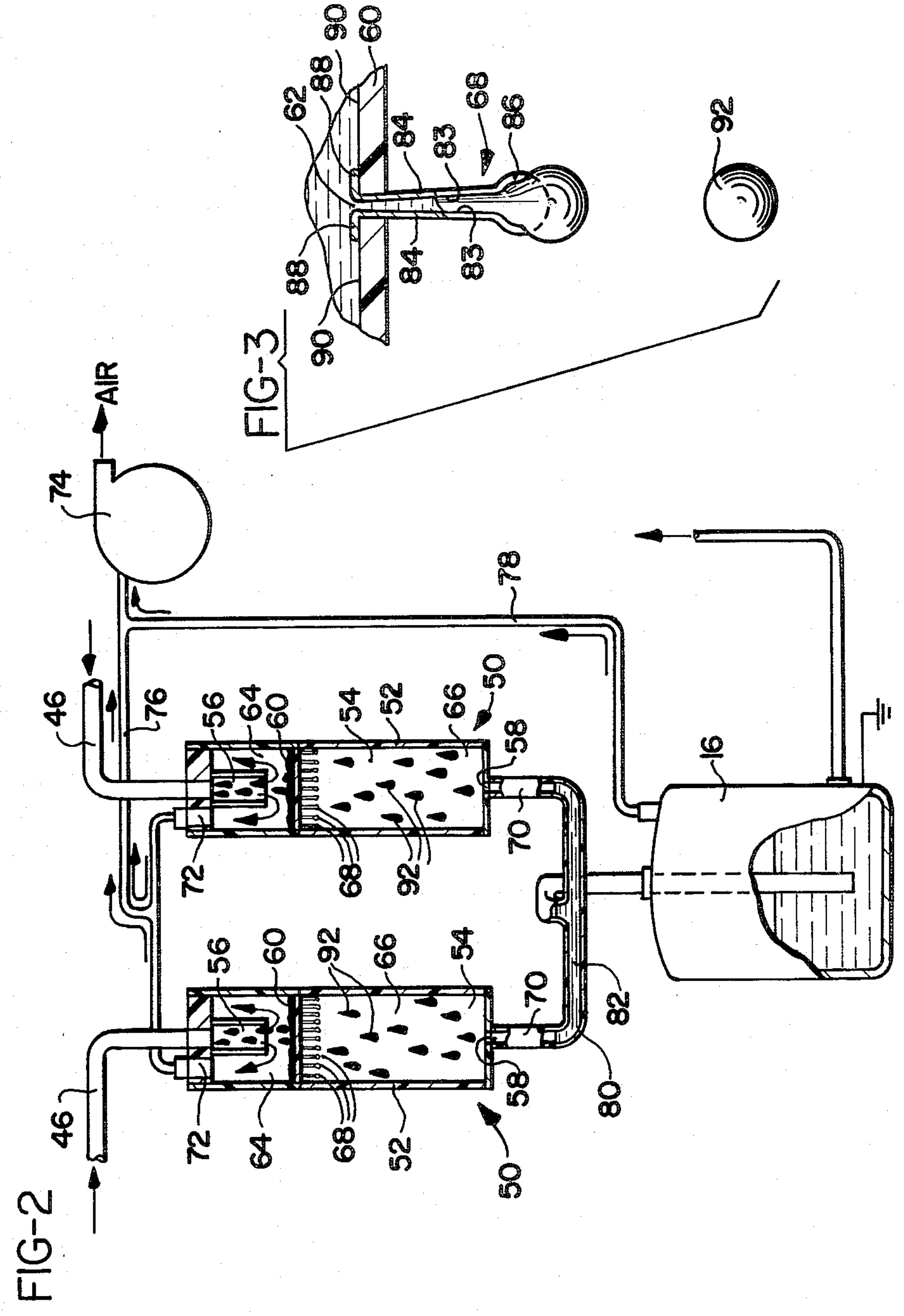
FIG. 2 is a partial sectional view showing the charge decoupling system of the present invention.
FIG. 3 is an enlarged partial sectional view of a portion of the charge decoupling device, illustrating a drop stream stabilizing device.

FIGS. 2 and 3 which illustrate the charge decoupling system of the present invention in greater detail. The charge decoupling system 48 includes a pair of charge decoupling container means 50, each of which includes an electrically nonconductive casing means 52 defining an interior casing cavity 54. Casing means 52 further defines an inlet opening 56 in the upper portion thereof connected to inlet lines 46 and communicating with the cavity 54. Casing means 52 also defines an outlet opening 58 in the lower portion thereof communicating with cavity 54. A perforated plate 60 defines a plurality of perforations 62, one of which is illustrated in FIG. 3. Perforated plate 60 is mounted in cavity 54, extending horizontally thereacross, to divide cavity 54 into an upper fluid receiving portion or chamber 64 and a lower drop portion or chamber 66.

A plurality of drop forming stabilizer means 68 are provided, each of the stabilizer means being mounted adjacent an associated one of the perforations 62 and defining a downwardly extending fluid path from the associated perforation into the lower portion 66 of cavity 54. Fluid supplied to the device through the fluid inlet line 46 accumulates on the perforated plate in the upper portion 64 and, thereafter, passes downward through the perforations 62 along associated fluid paths to form a plurality of drop streams, thus producing a low conductivity electrical path between inlet lines 46 and outlet lines 70.

The nonconductive casing 52 further defines a vacuum opening 72 communicating with the upper portion 64 of the casing cavity 54. A vacuum pump 74 is connected to the upper portion 64 via line 76 for providing a partial vacuum within the upper portion 64 of the casing cavity of each of the devices 50. Vacuum pump 74 is also connected to fluid supply tank 16 via line 78.

In the printer of the present invention, fluid vacuum inlet lines 46 are preferably made of an electrically nonconductive material. Thus, the only electrical path to ground from the catchers 36, to which relatively high level deflection potentials are applied, would be via the flow of electrically conductive fluid through vacuum lines to supply tank 16. The devices 50 of the present invention, however, create a high impedence electrical path between catchers 36 and grounded supply tank 16 to prevent catchers 36 from being shorted to ground. This high impedence path is produced by breaking up the fluid flow through devices 50 into a plurality of drop streams in which the drops are spaced apart by a substantial distance in each of the streams. This noncontinuous fluid flow prevents a high conductivity electrical path from being created through the electrically conductive fluid in the devices 50. It will be appreciated, however, that the fluid drops in chamber 66 may carry some residual electrical charge. In order to neutralize these charges, common manifold 80 of electrically nonconductive material is connected to the lower drop chambers 66 for receiving ink therefrom. The manifold defines a fluid trap 82 in which ink from the devices 50 is intermingled, thus generally neutralizing any electrical charges of opposite polarity which may be carried by the ink received from devices 50. The fluid trap is, in turn, connected to return ink to supply tank 16.

FIG. 3 illustrates a drop stabilizer 68 in greater detail. The drop stabilizer 68 defines a pair of downwardly extending fluid flow surfaces 83 defined by leg portions 84. The leg portions are spaced apart so as to provide a capillary path between surfaces 83 which tends to draw fluid from the perforation 62 to the lower end of the stabilizer means, where drops of the fluid are formed. The stabilizer means includes a lower arcuate portion 86 which connects the leg portions 84. Leg portions 84 extend through perforation 62 and engage opposite sides of the perforation. The upper ends 88 of the leg portions 84 are bent outwardly to engage the upper surface 90 of the perforated plate 60, thereby supporting each of the stabilizer means within the perforation associated therewith. In order to ensure that the stabilizer means is held securely within the perforation 62, the leg portions 84 may be spring biased apart, thus urging the leg portions against opposite sides of the perforations 62. Note that the fluid flow surfaces 83 defined by the leg portions 84 are closer together adjacent the perforation than adjacent the lower arcuate portion 86. By such an arrangement, fluid is not retained by capillary action adjacent the lower end of the stabilizer means, but rather flows from the lower end of the stabilizer means to form drops 92.

By utilizing a stabilizer means with each of the perforations, a drop stream from each of the perforations is produced which is relatively uniform in drop size and spacing. If the stabilizer means were omitted and a simple perforated plate were to be used in the device of the present invention, fluid flowing downward through the perforations would collect on the bottom of the plate. Fluid flowing through a number of adjacent perforations would merge on the bottom of the plate to produce one or more continuous fluid streams flowing downward along the interior wall of cavity 54. Such continuous fluid streams would produce electrically conductive paths through the device. In order to ensure that a relatively nonconductive electrical path is produced, all fluid passing through the device is broken up into drops of relatively small size, with sufficient distances separating the drops so as to preclude formation of electrical paths between the drops.

While the form of apparatus herein described constitutes a preferred embodiment of the invention, it is to be understood that the invention is not limited to this precise form of apparatus, and that changes may be made therein without departing from the scope of the invention.

What is claimed is:

1. A device connecting a fluid inlet line and a fluid outlet line to permit flow of electrically conductive fluid therebetween, while presenting a low conductivity electrical path between said fluid inlet and outlet lines, comprising:

electrically nonconductive casing means defining an interior casing cavity and further defining an inlet opening in the upper portion thereof connected to said inlet line and communicating with said cavity and an outlet opening in the lower portion thereof connected to said outlet line and communicating with said cavity, a perforated plate defining a plurality of perforations and mounted in said cavity, extending thereacross, to divide said cavity into an upper fluid receiving portion and a lower portion, and a plurality of drop stabilizer means, each of said stabilizer means mounted adjacent an associated one of said perforations and defining a downwardly extending capillary fluid path from said associated perforation into said lower portion of said cavity such that fluid supplied to said device through said fluid inlet line accumulates on said perforated plate in said upper portion and thereafter passes downward through said perforations along associated fluid paths to form a plurality of fluid drops which drip from said stabilizer means, thereby creating said low conductivity path between said inlet and said outlet lines, each of said drop stabilizer means defining a pair of downwardly extending fluid flow surfaces, said surfaces defining said capillary path therebetween.

2. The device of claim 1 in which said electrically nonconductive casing means defines a vacuum opening communicating with said upper portion of said casing cavity and in which said device further comprises vacuum means connected to said vacuum opening for providing a partial vacuum within said upper portion of said casing cavity.

3. The device of claim 1 in which each of said stabilizer means includes a lower arcuate portion and a pair of upwardly extending leg portions, said leg portions defining said capillary path therebetween and engaging said perforated plate adjacent opposite sides of the perforation associated therewith.

4. The device of claim 3 in which said fluid flow surfaces are closer together adjacent said perforation than adjacent said lower arcuate portion, whereby said fluid is not retained by capillary action adjacent the lower end of said stabilizer means but flows from the lower end of said stabilizer means, forming a drop stream.

5. The device of claim 3 in which said upwardly extending leg portions extend through said perforation associated therewith.

6. The device of claim 5 in which said upwardly extending leg portions are spring biased apart such that said leg portions are urged against opposite sides of said perforation associated therewith.

7. The device of claim 5 in which the upper ends of said leg portions are bent outwardly to engage the upper surface of said perforated plate, thereby supporting each of said stabilizer means within said perforation associated therewith.

8. In a jet printer including an electrically grounded print head defining a fluid receiving reservoir from which a plurality of jet drop streams issue, fluid supply means for supplying electrically conductive fluid to said reservoir, drop charging means for selectively charging drops in said streams, to positive and negative charge potentials, and a pair of drop ingesting catchers, and means for supplying electrical deflection potentials of opposite polarity to said catchers such that a deflection field is created between said catchers for deflecting charged drops to said catchers to be ingested thereby, an improved charge decoupling system for removing accumulated fluid from said catchers and returning said fluid to said fluid supply means while presenting a high impedance electrical path between said catchers and said fluid supply means, comprising:

a pair of electrically nonconductive charge decoupling container means, each container means defining an upper fluid receiving chamber and a lower drop chamber, each container means further comprising a perforated plate, defining a plurality of perforations, extending horizontally within said container so as to separate said upper and lower chambers, and drop forming means in said lower drop chamber associated with each of said perforations for defining a capillary path extending downward from each of said openings, whereby fluid drops drip from each of said drop forming means, producing a plurality of drop streams in said lower drop chamber, vacuum lines connecting each of said catchers to a respective one of said upper fluid receiving chambers of said container means, a common manifold connected to the lower chamber of each of said container means and defining a fluid trap in which drops from said container means are intermingled to neutralize charges carried thereby, and supply line means connecting said common manifold with said fluid supply means for returning fluid thereto, whereby said catchers are electrically isolated from each other and from said fluid supply means such that said catchers may be maintained at electrical deflection potentials of opposite polarity, while said print head is grounded and electrically conductive fluid is recirculated from said catchers to said print head.

9. The charge decoupling system of claim 8 further comprising vacuum means for supplying a partial vacuum to each of said upper fluid receiving chambers of said charge decoupling container means.

10. The charge decoupling system of claim 8 in which each of said drop forming means defines a pair of downwardly extending fluid flow surfaces, said surfaces being spaced apart so as to provide a capillary path therebetween which tends to draw fluid from the perforation associated therewith to the lower end of said drop forming means, fluid drops being formed at the lower end of said drop forming means.

11. The charge decoupling system of claim 10 in which each of said drop forming means includes a lower arcuate portion and a pair of upwardly extending leg portions, said leg portions defining said capillary path therebetween and engaging said perforated plate adjacent opposite sides of the perforation associated therewith.

12. The charge decoupling system of claim 10 in which said fluid flow surfaces are nonparallel and diverge toward the lower end of said drop forming means, whereby said fluid is not retained by capillary action adjacent the lower end of said drop forming means but forms a drop stream from the bottom thereof.

13. The charge decoupling system of claim 11 in which said upwardly extending leg portions of each drop forming means extend through said perforation associated therewith.

14. The charge decoupling system of claim 13 in which said upwardly extending leg portions are spring biased against opposite sides of said perforation associated therewith.

15. The charge decoupling system of claim 13 in which the upper ends of said leg portions are bent outwardly to engage the upper surface of said perforated plate, thereby supporting said drop forming means within said perforation associated therewith.

16. An ink jet printer comprising:

print head means including a fluid receiving reservoir and an orifice plate communicating therewith, said orifice plate defining a pair of rows of jet orifices, fluid supply tank means for supplying electrically conductive ink under pressure to said fluid receiving reservoir to produce a pair of rows of jet drop streams emanating from said orifices, drop charging means for selecting charging drops in a first of said jet drop stream rows to an electrical charge level and for selectively charging drops in the other of said jet drop stream rows to an electrical charge level, deflection electrode means including a pair of drop catchers positioned on opposite sides of said pair of row of jet drop streams, means for supplying electrical deflection potentials to said catchers to produce a deflection field which deflects selectively charged drops in said jet drop streams outwardly to strike said catchers, a pair of vacuum lines, each of said vacuum lines connected to an associated one of said catchers for removing ink therefrom, a pair of charge decoupling devices, each of said devices connected to an associated one of said vacuum lines and each defining an upper ink receiving chamber and a lower drop chamber, said upper and lower chambers being partitioned by an intermediate perforated plate defining a plurality of perforations, each of said charge decoupling devices further including means defining downwardly extending, drop-forming capillary paths from said perforations into said drop chamber, manifold means connected to said lower drop chambers of said charge decoupling devices for receiving ink therefrom, said manifold means defining a fluid trap in which ink from said pair of charge decoupling devices is intermingled, said manifold means connected to said fluid supply tank means for returning ink from said fluid trap to said fluid supply tank means, and partial vacuum means for supplying a partial vacuum to said upper chambers tending to draw ink from said catchers thereinto through said vacuum lines, whereby said drop catchers are substantially electrically isolated from the other elements of said printer.

17. The ink jet printer of claim 16 in which said means for supplying electrical deflection potentials includes means for supplying electrical deflection potentials of opposite polarity to said catchers to produce a deflection field extending therebetween and in which said drop charging means comprises means for selectively charging drops in said first of said jet drop stream rows to a positive electrical potential and for selectively charging drops in said second of said jet drop stream rows to a negative electrical potential.

18. The device of claim 1 in which said downwardly extending fluid flow surfaces are nonparallel and diverge toward the lower end of said drop stabilizer means, whereby fluid is not retained by capillary action adjacent the lower end of said drop forming means but forms a drop stream from the bottom thereof.

* * * * *